US009402283B2

(12) United States Patent
Chubb

(10) Patent No.: US 9,402,283 B2
(45) Date of Patent: Jul. 26, 2016

(54) SPRING CLIP CORNER KEY ASSEMBLY

(76) Inventor: Richard A. Chubb, Voorhees, NJ (US)

( * ) Notice: Subject to any disclaimer, the term of this patent is extended or adjusted under 35 U.S.C. 154(b) by 1666 days.

(21) Appl. No.: 12/798,806

(22) Filed: Apr. 12, 2010

(65) Prior Publication Data

US 2011/0248014 A1 Oct. 13, 2011

(51) Int. Cl.
*H05B 3/00* (2006.01)
*F16B 7/00* (2006.01)
*H05B 3/84* (2006.01)

(52) U.S. Cl.
CPC ............ *H05B 3/84* (2013.01); *H05B 2203/016* (2013.01)

(58) Field of Classification Search
CPC ............................ H05B 2203/016; H05B 3/84
USPC ......... 219/213, 214, 520, 521, 522, 541, 543, 219/546; 403/292–295
See application file for complete search history.

(56) References Cited

U.S. PATENT DOCUMENTS 3,200,913 A * 8/1965 Nelson .......................... 403/294
3,379,859 A * 4/1968 Marriott ........................ 219/522
3,760,157 A * 9/1973 Newman et al. .............. 219/522
3,918,783 A * 11/1975 DuRocher et al. .............. 439/55
4,113,905 A * 9/1978 Kessler ........................... 428/34
4,636,105 A * 1/1987 Johansson ...................... 403/205
4,682,840 A * 7/1987 Lockard ......................... 439/874
4,684,191 A * 8/1987 Feher et al. ................... 439/246
4,691,486 A * 9/1987 Niekrasz et al. ................ 52/172
4,845,859 A * 7/1989 Evans ............................. 34/107
4,987,283 A * 1/1991 Beinhaur et al. .............. 219/616
5,076,736 A * 12/1991 Grewe et al. .................. 403/295
6,247,948 B1 * 6/2001 Davis et al. ................... 439/188

* cited by examiner

*Primary Examiner* — Sang Y Paik
(74) *Attorney, Agent, or Firm* — Francis C. Hand; Carella, Byrne

(57) ABSTRACT

Each corner key assembly of an insulating glass unit is constructed of an electrically non-conductive housing having a pair of arms disposed in perpendicular relation to each other to engage with respective ends of a spacer system and a central post extending in parallel to one of the arms with an electrically conductive spring clip mounted in the post to engage a bus bar. The spring has a reversely curved portion extending from the post of the housing to lie flat against the opposed glass panes of the IG unit. Each corner key may be used as either a right-hand or as a left-hand corner key by being flipped over on itself.

13 Claims, 8 Drawing Sheets

SPRING CLIP CORNER KEY ASSEMBLY

This application claims the benefit of Provisional Patent Application 61/214,013, filed Apr. 16, 2009.

This invention relates to a spring clip corner key assembly. More particularly, this invention relates to a spring clip corner key assembly for an electrically heated insulating glass unit.

As is known, insulating glass (IG) units have been employed for use in refrigerated cabinets and the like. In many cases, the insulating glass units have been constructed of a pair of window panes or lites that are spaced apart by spacers to form an insulating air space therebetween. Typically, an insulating glass unit is held within a frame that surrounds the perimeter of the unit. In addition, a transparent electrically conductive heating film has been bonded to at least one of the panes and a pair of conducting bus bars has been mounted on the pane in electrical contact with the conductive film on opposite sides of the coated pane of glass. Such insulating glass units have been described, for example, in U.S. Pat. Nos. 4,127,765; 4,306,140; 4,691,486 and 5,255,473.

In order to deliver electrical energy to the bus bars and heating film, use has been made of an electrical circuit that is connected to the bus bars. Typically, this electrical circuit requires an electrical lead that passes through the frame of the insulating glass unit so that the lead can make electrical contact with a bus bar via an electrical contact, such as a solder joint, or the like. However, one of the drawbacks of this type of electrical circuit is that the electrical circuit and electrical lead have been incorporated during the assembly of each individual insulating glass unit which requires a labor-intensive and time-consuming process. This approach to making the necessary electrical connections has effectively prevented the ability to produce electrically heated insulating glass units on highly-automated conveyorized-type insulating glass assembly equipment. This inability to automate the assembly process is due primarily due to the wire leads that are needed for completing the electrical circuit being attached to, or in contact with, the coated piece of glass during assembly. These wire leads cannot be installed when a unit is being conveyed down an automated production line, as they will foul the conveyorized equipment.

It has also been known from U.S. Pat. Nos. 3,760,157 and 3,876,862, to employ a spring clip, i.e. a corner key, within an electrical circuit for delivering power from a lead to a bus bar. However, multiple sizes of spring clips must be made available in order to assemble insulating glass units that require differently spaced apart glass panes. Further, in cases where a pair of spring clip arrangements is used to complete a circuit across an electrically conductive coating and a pair of bus bars, both left-hand and right-hand spring clip arrangements must be made available for assembly purposes for opposite sides of the heating film.

Since electrically heated insulating glass units frequently use different types and sizes of spacers across multiple air space widths, costly hard tooling for each variation of spacer width, type, cross-section and the like has been required in forming the electrical connections for energizing the glass units. Further, considerable time must be employed in order to modify the tooling for the assembly of insulating glass units of different widths and types.

Accordingly, it is an object of the invention to provide a modular spring clip corner key assembly for use in insulating glass units of different sizes and spacer distances.

It is another object of the invention to provide for a rapid assembly of an insulating glass unit employing an electrically conductive heating film.

It is another object of the invention to provide a modular construction for a corner key assembly for energizing an electrically heated insulating glass unit.

It is another object of the invention to provide a corner key assembly that may be used as a left-hand assembly or a right-hand assembly.

It is another object of the invention to provide a means for creating an electrical contact with the bus bars and conductive glass coating that can be used on highly-automated production lines which cannot accommodate wire leads that are installed onto the insulating glass units while the units is being conveyed or transported or otherwise manipulated by automated equipment during the construction or assembly process.

Briefly, the invention provides a spring clip corner key assembly of modular construction for an electrically heated insulating glass unit. The assembly comprises a housing formed of a pair of parts disposed in removable mating relation and a spring clip having a mounting portion disposed between the housing parts and a reversely curved portion extending from the mounting portion and the housing.

In order to secure the spring clip in the housing, a pair of posts is provided on one of the housing parts while a pair of openings is provided in the mounting portion of the spring clip for receiving the posts or vice versa.

In addition, each part of the housing of the spring clip assembly includes a pair of arms that extend perpendicularly of each other and in mating parallel relation to a pair of arms on the other part. Also, each arm has a bifurcated female end defining a recess therein which can accept the ends of a tape-style spacer system, such as a SuperSpacer® foam spacer, or Swiggle butyl spacer, and the like. Another alternative version of these perpendicular corner key "ends" includes male ends with cross-sections that are shaped to conform to the "inside" geometry of a hollow spacer assembly such as roll-formed aluminum or metal spacer bar, extruded plastic spacer bar, and the like.

The two parts of the housing are shaped to define a cavity therebetween to receive an AMP connector, or similar type of electrical connector, that is electrically connected to the mounting portion of the spring clip and is fabricated to receive the end of a wire lead. These are often known generically as "crimp on connectors".

The two parts of the housing also define a passageway through which a wire lead may pass to connect to the electrical connector to transfer power therebetween.

The invention further provides an insulating glass unit (IG unit) comprising at least a pair of glass panes (or lites); a perimeter spacer system that functions as a means for maintaining the glass panes in parallel spaced apart relation; a transparent electrically conductive heating film bonded to at least one of the panes and a pair of electrically conductive bus bars mounted in electrical contact on the coated pane or panes of glass on opposite sides of the coated pane or panes of glass.

In addition in accordance with the invention, the insulating glass unit has a corner key assembly, as above, disposed between the panes at each of two corners thereof with the spring clip of each in electrical contact with a respective bus bar.

After a glass pane has been provided with an electrically conductive film and the pair of bus bars, the spacer system is applied to the glass pane. In this respect, where use is made of a SuperSpacer® foam spacer, strips of the spacer are adhesively applied to the glass pane to form a rectangular frame and a pair of corner keys are disposed at the corners of the resulting frame to receive respective ends of the spacer strips.

At this time, the spring clips of the corner keys are aligned with and come to rest on the bus bars.

Next, the remaining second glass pane is placed over the spacer system in alignment with the first glass pane and is adhered to the strips of the spacer system. A hermetic sealant system is then applied to the outer perimeter of the spacer frame and between or over the outer edges of the glass panes (lites of glass) to seal the IG unit except for leaving a gap to provide access to each corner key for an electrical connector. For example, a wire power lead with an AMP-connector (or similar type of modular connector) is inserted through the passageway (or hollow cavity) in one corner key assembly to connect to the modular electrical connector within the spring clip corner key connected to the terminal end of the metal spring clip in order to deliver electrical power thereto. A similar wire lead is inserted through the passageway (or hollow cavity) in the other spring clip corner key assembly to connect to the electrical connector within the housing thereof to complete the electrical circuit.

When the insulating glass unit is assembled, each bifurcated end of an arm of each corner key assembly is placed over the end of the tape-style spacer system during insulating glass unit assembly. In the alternative embodiment of the spring clip corner key that is for use with hollow-cross section spacer systems (e.g., aluminum, plastic, etc.), the spring clip corner keys are inserted into the hollow spacer cross section to form a frame with four corner keys, two of which are spring-clip corner keys, and two of which are standard corner keys (e.g., nylon injection-molded, zinc die cast, and the like.)

The metallic spring clip itself is of a unique construction in order to be used in a left-hand corner key or a right-hand corner key. In this respect, the reversely curved portion of the spring clip includes a first rectilinear section extending from the mounting portion in an offset relation, a second rectilinear section opposite the first rectilinear section and defining an included acute angle therebetween, i.e. an angle of 15° or 20° depending on the gap between the panes of the glass unit, and a third curved section between and connected to the first rectilinear section and the second rectilinear section. The reversely curved portion of the spring clip further includes a fourth curved section at a terminal end of the second rectilinear section that is directed toward the first rectilinear section. The geometry of the metal spring clip is such that when the spring clip is compressed between two parallel panes of glass, the large flat surfaces of the spring clip will contact both parallel surfaces of glass in a flat manner, with full contact. The curved end of the free end of the clip is curved in order to prevent this free end from "scratching" or "scraping" the glass or the bus bar when the two opposing panes of glass are brought together to form the enclosed "airspace" of the insulating glass unit.

The construction of the housing of the corner key assembly is of a modular type so that one part (i.e. the base) of the housing is common to different sizes, (i.e., thicknesses or air space widths) of the various corner key assemblies. This common part is formed with the posts for receiving the spring clip mounting portion. The other part of the housing may be of a different thickness depending upon the space between the glass panes in an insulating glass unit. This modular construction allows for easily changeable mold inserts to be used for molding the two parts of the housing in order to accomplish flexibility in size within the molds that are used to make the corner key that houses the conductive spring clip.

The construction of the corner key assembly allows the use of highly automated manufacturing equipment for making IG units. For example, the overall thickness of the housing of the corner key may be easily changed depending upon the spacing between the window panes of an IG unit. Further, the use of the corner key assembly eliminates a requirement for separate right hand and left hand corner key constructions. In accordance with the invention, the corner key assembly may be simply "flipped over" to handle opposite handed corners in an IG unit. Further the unique spring clip design allows the spring clip to be "flipped over" to energize opposing glass surfaces without requiring separate forming of right hand and left hand spring clips. This, in turn, provides the ability to energize parallel electrically-conductive glass panes.

Further, the corner key assembly allows the manufacture of an IG unit on highly automated equipment without a need to be concerned about a need to accommodate the presence of a wire lead during assembly. In this respect, the wire lead may be added to the insulating glass unit after assembly. This is a critical requirement for being able to manufacture or assemble electrically-heated insulating glass units using conveyorized or robotized assembly systems, which necessarily have moving parts in close proximity to the perimeter of the insulating glass unit, wherein wire leads would interfere with the assembly or transport processes. To automate the assembly of insulating glass units, there cannot be wire leads or other components protruding from the perimeter of the unit. This invention solves this problem by allowing for the leads to be attached after the assembly is essentially complete.

These and other objects and advantages of the invention will become more apparent from the following detailed description taken in conjunction with the drawings wherein FIG. 1 illustrates a front view of an insulating glass unit constructed in accordance with the invention;

Figure 1:
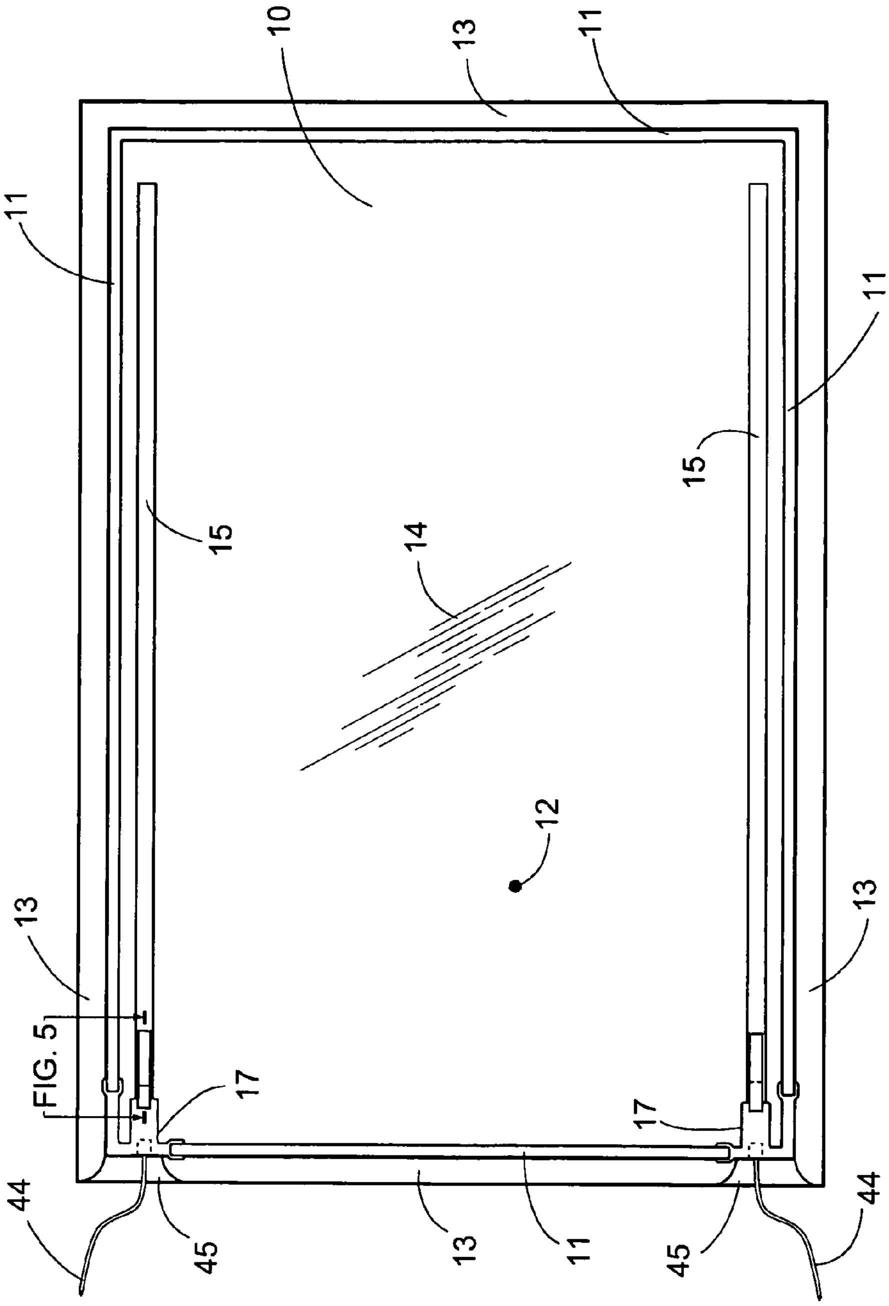

Referring to FIG. 1, the insulating glass (IG) unit 10 includes a tape-like insulating glass spacer that creates a spacer system or frame 11 that is utilized to separate a pair of glass panes (or lites of glass) 12 mounted or placed on either side of the frame 11 in a conventional manner. In this respect, the spacer frame 11 is formed of a plurality of strips that form a rectangular frame 11 and each of which is adhesively secured to each glass pane 12 to maintain the panes 12 as a unit. A suitable sealing bead 13 is also disposed peripherally behind the spacer system or frame 11 to seal the space between the glass panes 12 in a hermetic manner, as is known.

A transparent electrically conducted heating film 14 is bonded to the inside of at least one of the glass panes 12 in facing relation to the hermetically sealed space. In addition, a pair of bus bars 15 is mounted on the pane 12 in electrical contact with opposite sides of the heating film 14 so that the bus bars 15 are generally parallel to each other.

The construction of the IG unit 10 is conventional and need not be further described except for the following.

Figure 2:
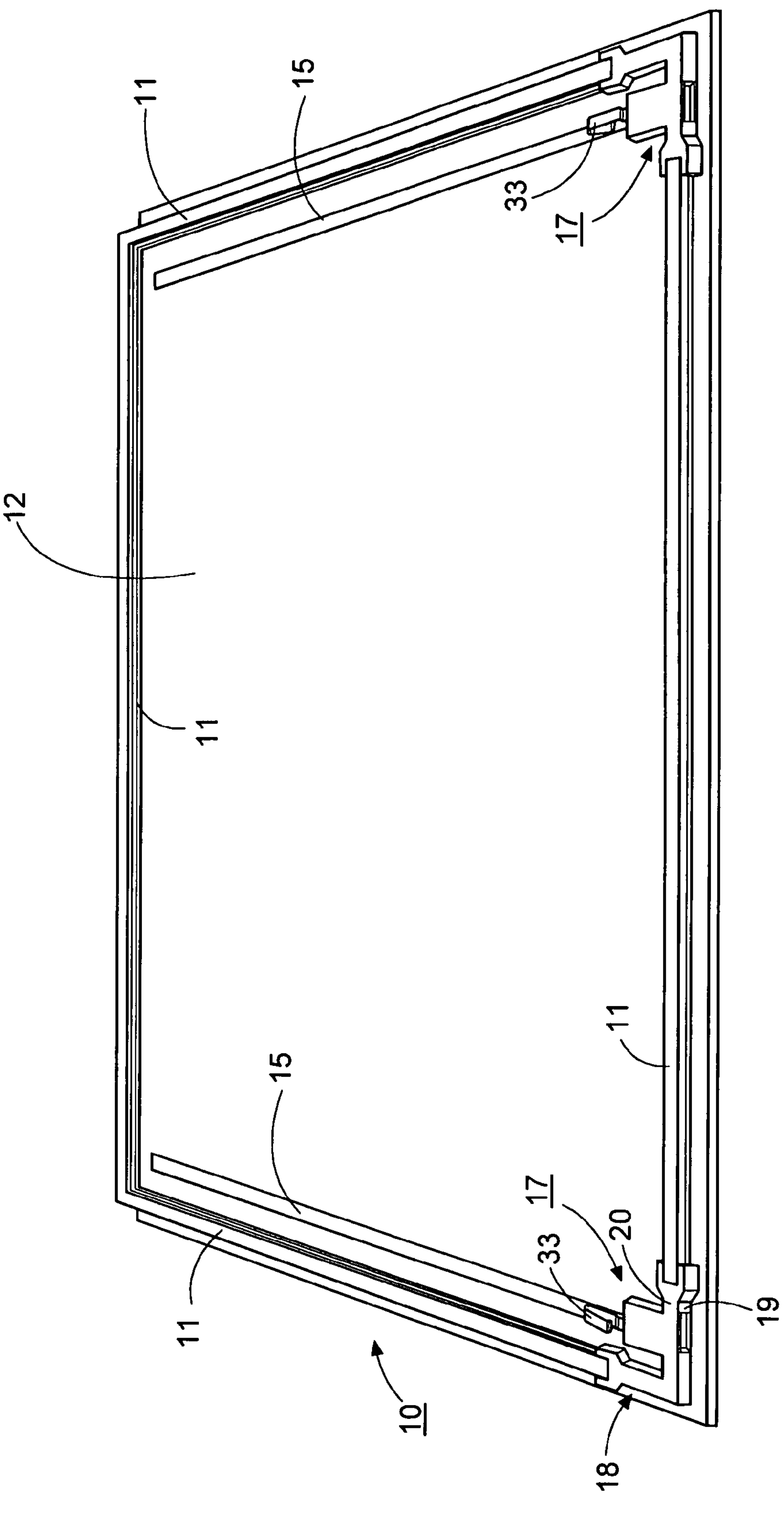
FIG. 2 illustrates a front view of a partial assembly of the insulating glass unit of FIG. 1.

The IG unit 10, in accordance with the invention, has an electrically conductive corner key assembly 17 (i.e., "spring clip corner key") disposed between the panes 12 at each of two corners, typically on one side of the insulating glass unit, as illustrated in FIG. 2 although these spring clip corner key assemblies 17 can be placed in diagonally-opposite corners such that each contacts a separate bus bar 15. In this respect, the corner key assemblies 17 are of identical construction; however, one assembly 17 is "flipped over" relative to the other, as shown in FIG. 2, such that one functions as a left-handed corner key assembly and the other as a right-handed corner key assembly.

Figure 3:
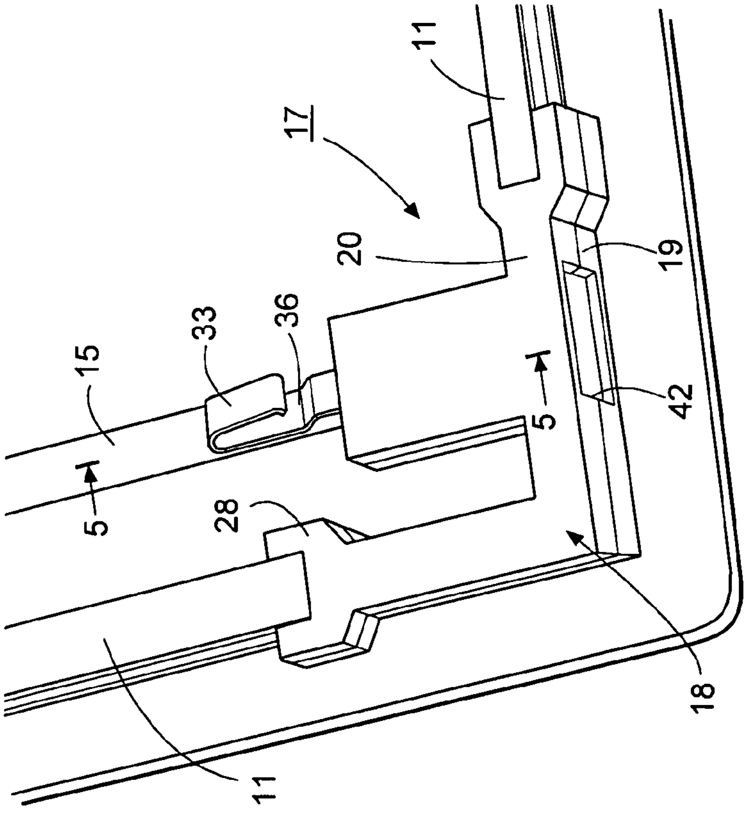
FIG. 3 illustrates a perspective view of the corner key in a left-hand position, as viewed.

Referring to FIGS. 2 and 3, the left-hand corner key assembly 17 includes an electrically non-conductive housing 18, for example of plastic, formed of a pair of parts (or two non-symmetrical "halves") 19, 20 that are disposed in mating relation.

Figure 6:
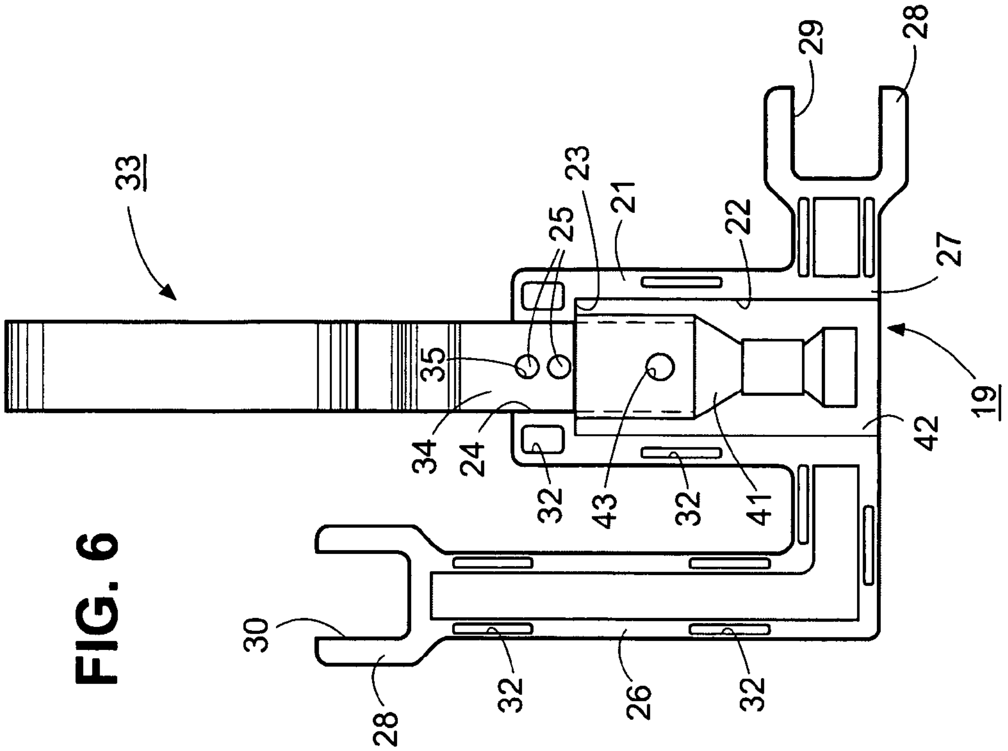
FIG. 6 illustrates a plan view of the common part of a corner key assembly in accordance with the invention.

Referring to FIG. 6, the lowermost or bottom part 19 of the housing 18 has a central portion 21 (or hollow post) of rectangular shape formed with a rectangular depression 22 and a shoulder 23 at one end of the depression 22. This shoulder 23 has a recess 24 in which a pair of posts 25, for example of cylindrical shape, is disposed coaxially of the depression 22 for purposes as explained below.

The housing part 19 also has a pair of arms 26, 27 that extend perpendicularly of each other. As shown, one arm 27 extends across the central portion 21 (or hollow post) while the other arm 26 extends in spaced parallel relation to the central portion 21. Each arm 26, 27 has a bifurcated end 28 that defines a block-U-shaped recess 29, 30, respectively.

Figure 4:
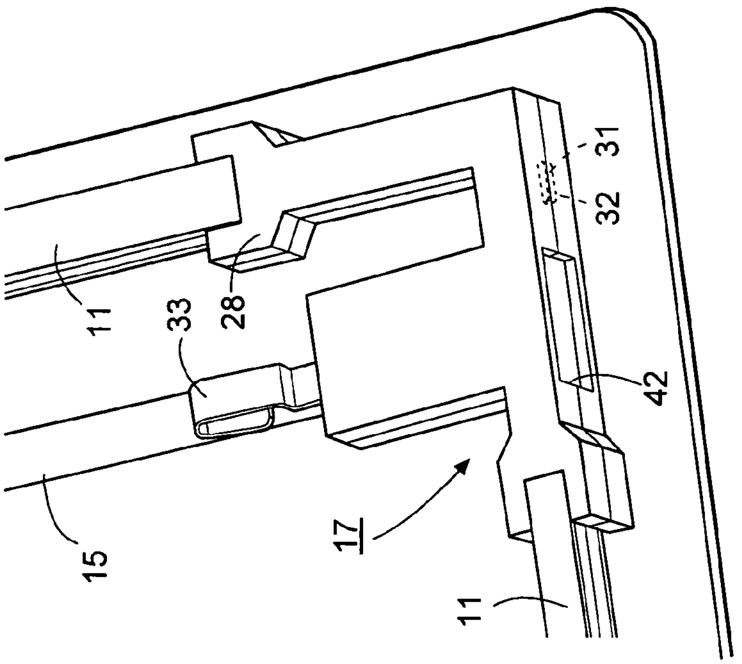
FIG. 4 illustrates a view of the corner key assembly in a right-hand position, as viewed.

Referring to FIGS. 3 and 4, the upper part (or half) 20 of the housing 18 is of mirror image construction to the bottom part 19 but for the recess 24 and posts 25 and need not be further described.

The housing parts 19, 20 are provided with a plurality of posts 31 (see FIG. 4) and mating recesses 32 for mating of the two parts 19, 20 to each other. For example, the posts 31 are disposed on the upper part 20 while the recesses are disposed in the bottom part 19. The posts 31 may be of any suitable shape, such as, circular, rectangular, oval, and the like, while the recesses 32 are of a mating shape.

When the housing parts 19,20 are mated together, the recesses 29, 30 of the respective parts 19, 20 receive an end of the tape-style spacer frame 11, as shown in FIGS. 2 and 3. Typically, the spacer frame 11 is formed of individual strips.

Referring to FIGS. 3 and 6, the left-hand corner key assembly 17 also has an electrically conductive spring clip 33 mounted within the housing 18 to contact a bus bar 15. To this end, the spring clip 33 is made of an electrically conductive material, such as beryllium copper or the like.

When the housing parts 19, 20 are mated together, the housing 18 has a pair of arms formed by the mating arms 26,27 disposed in perpendicular relation to each other and a central post formed by the mating central portions 21 extending in parallel to one of the arms 26,27 and having the spring clip 33 extending therefrom.

Figure 8:
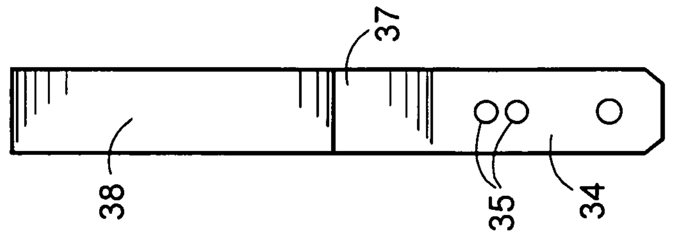
FIG. 8 illustrates a side view of the spring clip of FIG. 7.
Figure 7:
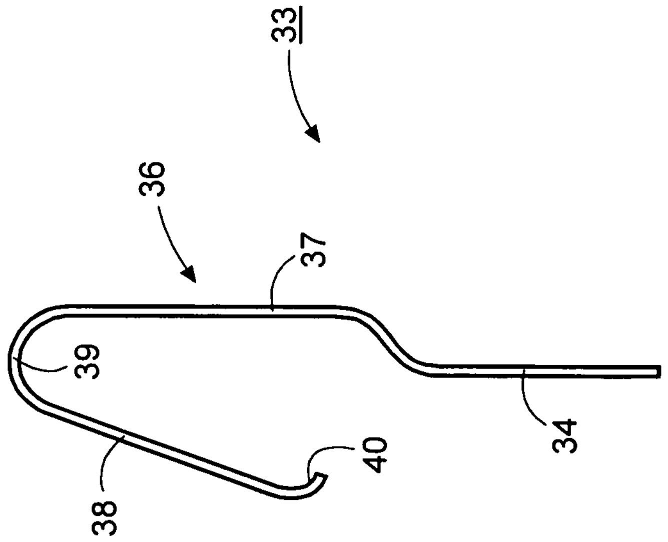
FIG. 7 illustrates a side view of a spring clip in accordance with the invention.

Referring to FIGS. 6, 7 and 8, the spring clip 33 has a flat mounting portion 34 that has a pair of openings 35 receiving the posts 25 of the bottom housing part 19 for retaining of the spring clip 33 in the assembly 17.

As shown in FIG. 7, the spring clip 33 has a reversely curved portion 36 extending from the mounting portion 34 for contacting a bus bar 15. This reversely curved portion 36 includes a first rectilinear section 37 that extends from the mounting portion 34 in an offset relation, a second rectilinear section 38 opposite the first rectilinear section 37 and a third curved section 39 between and connected to the rectilinear sections 37, 38. As illustrated, the two rectilinear sections 37, 38 define an included acute angle A therebetween, for example of 15° to 20° depending upon the spacing between the panes 12 of the IG unit before being mounted in place. As illustrated, the included angle A is 20°.

Figure 5:
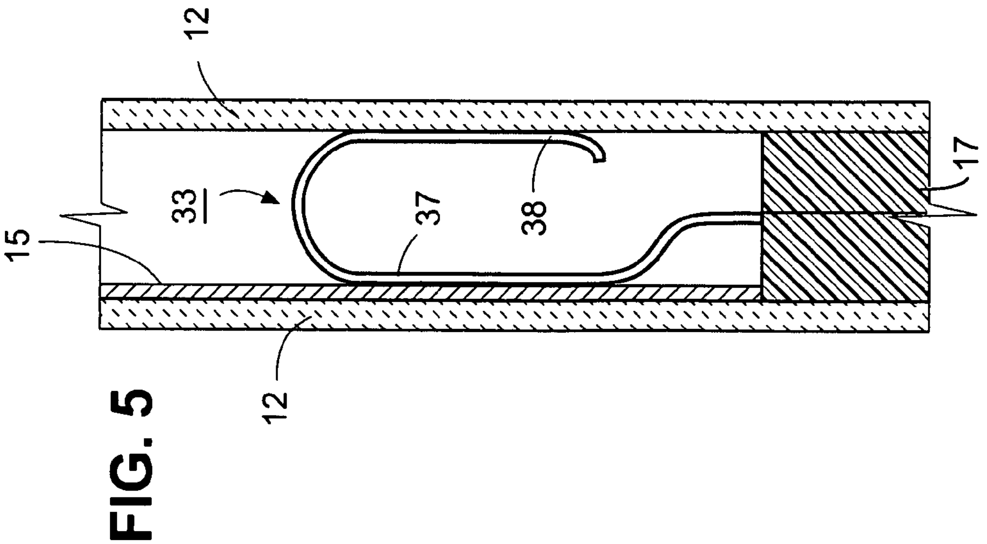
FIG. 5 illustrates a cross sectional view of the insulating glass unit taken on line 5-5 of FIG. 1.

When in place, as shown in FIG. 5, the two rectilinear sections 37, 38 of the spring clip 33 are flexed towards each other by the panes of glass 12 of the IG unit 10 to lie "flat" against the bus bar on the one pane of glass 12 and the opposing surface of the other pane of glass 12.

Of note, the angles of the spring clip 33 are not critical. What is important is for the two rectilinear sections 37, 38 to lie "flat" against the opposing surfaces of the panes of glass 12 of the IG unit, so that the spring clip 33 can be reversible, or used in a left-handed or right-handed corner of an insulating glass unit. This spring clip 33 could be used with separately tooled left-handed and right-handed corner keys and metal spring clip contactors, but this would essentially double the tooling investment. The use of a spring clip that lies "flat" on both glass surfaces allows this embodiment to be used on opposite handed corners, with only one set of tooling.

Referring to FIG. 7, the reversely curved portion 38 of the spring clip 33 also includes a curved section 40 at a terminal end of the second rectilinear section 38 that is directed toward the first rectilinear section 37. The precise angle or curve of this "free end" is not important; however, it is important that the free end be curved away from the flat section 38, so that when the spring clip corner key assembly is placed onto the glass in either orientation, this free end does not scratch or damage the piece of glass that is coming down onto this side of the clip in compression. This curved end 40 allows the clip to compress evenly between the panes of glass without "hanging up" on the glass as the assembly is pressed together or laid up.

As illustrated in FIG. 6, the mounting portion 34 of the spring clip 33 is disposed about the posts 25 of the bottom housing part 19 and extends coaxially of the central portion 21.

As shown in FIG. 3, the spring clip 33 is disposed with the free end of the conductive spring clip 33 pointing upwardly away from the bus bar 15 whereas in the right-hand corner key assembly shown in FIG. 4, the free-end of the conductive spring clip 33 is directed downwardly toward the bus bar 15 thereat. FIGS. 3 and 4 thus show the "reversibility" of this particular embodiment of the clip and corner key design, although separately-handed spring clips could be tooled, at greater expense, to eliminate the need to flip the corner keys over.

Referring to FIG. 6, the depression 22 in the bottom housing part 19 and the like depression (not shown) in the upper housing part (not shown) define a cavity therebetween to receive an electrical connector 41 as well as a passageway 42 for the electrical connector 41 to pass into the cavity.

As shown in FIG. 6, the mounting portion 34 of the spring clip 33 has an opening 43 aligned with the pair of openings 35 to receive a detent (not shown) on the electrical connector 41 for holding the connector 41 in place when slid onto the mounting portion 34.

The electrical connector 41 is of a suitable type for electrically connecting a wire lead 44 (see FIG. 6) to the mounting portion 34 of the spring clip 33 to deliver power thereto. In this respect, the connector 41 is sized to pass through the passageway 42 into electrical engagement with the mounting portion 34 within the cavity formed by the depressions 22 while the wire lead 44 passes through the passageway 42.

A similar wire lead 44 connected to the right-hand corner key assembly 17 transmits an electrical current therefrom to complete a circuit with the bus bars 15 and electrically conductive heating film 14.

As shown in FIG. 1, the sealing bead 13 is provided with gaps 45 in alignment with the passageways 42 of the respective corner key assemblies 17 to allow access of an electrical connector 41 into the corner key assembly 17.

As shown in FIG. 2, the top end, as viewed, of both bus bars 15 terminate short of the spacer frame 11 (if this frame 11 were a metal spacer that would create a short circuit).

Each corner key assembly 17 may be adhesively secured or not to the glass panes. Generally, socketing of each key assembly 17 onto the ends of the strips of the spacer frame 11 is sufficient to maintain the key assemblies 17 in place during use.

In order to assemble a corner key assembly 17, a common housing part 19 is positioned so that the openings 32 in the mounting portion 31 of the spring clip 33 may be positioned over the posts 24. Next, an appropriate upper part 20 the housing 18 is selected and placed on top of the bottom part 19 via mating posts and recesses to sandwich the mounting portion 31 of the spring clip 33 in place in a secure manner. In this respect, the shoulder 23 of the bottom part 19 is slightly recessed to accommodate the thickness of the mounting portion 31 of the spring clip while the shoulder 23 of the top part 20 is not recessed but instead lays flat against the mounting portion 31 of the spring clip 33 and the remainder of the shoulder 23 of the bottom part 19.

The two housing parts 19, 20 may be held together in any suitable temporary manner prior to being incorporated into the IG unit 10.

The top part 20 of the housing 18 is selected from like parts of different thicknesses. For example, there may be five sizes of corner keys for use with different sized spacers, for example, one-quarter inch, five-sixteenth inch, one-half inch, five-eighth inch and three-quarter inch.

As indicated in FIG. 2, during assembly of the IG unit, the left-hand corner key assembly 17 and the right-hand corner key assembly 17 are placed at the respective corners of a glass pane 12 with a spacer strip 11 received within the bifurcated ends of the arms 26, 27. Thereafter, the second glass pane is put into place and the sealing bead 13 applied about the periphery.

Once the IG unit 10 has been formed, the electrical connectors 41 and wire leads 44 thereon may be inserted through the gaps 45 in the sealing bead 13 into the passageways 42 disposed within the housings 18 of the respective corner key assemblies 17 for connection to the spring clips 33. Thereafter, the gaps 45 may be sealed by applying a flowable polyurethane sealant, for example, using a pneumatic hand-held caulking gun, or by inserting any other suitable closure means.

Figure 9:
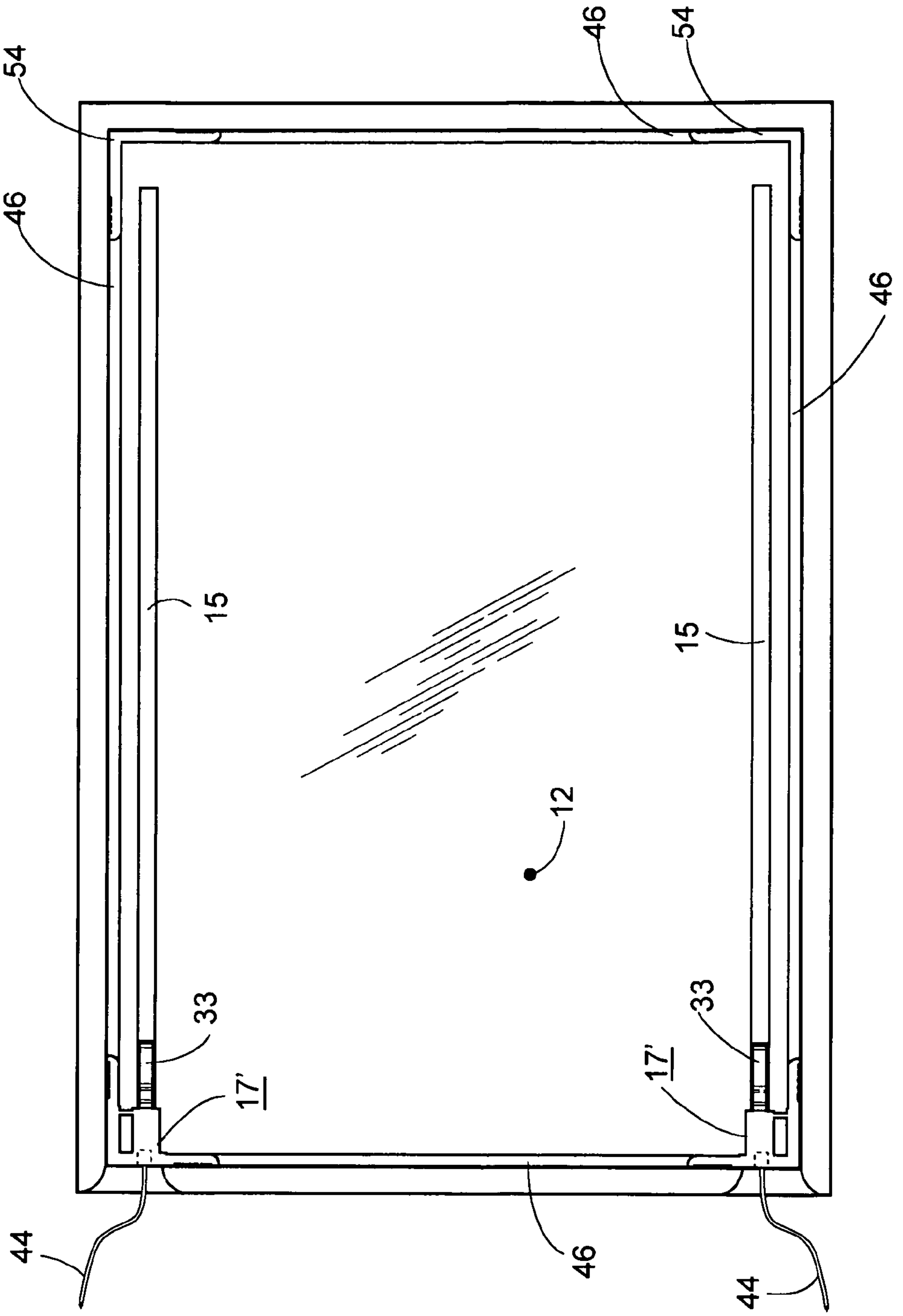
FIG. 9 illustrates a view similar to FIG. 1 of an insulating glass unit with a modified corner key assembly in accordance with the invention.
Figure 10:
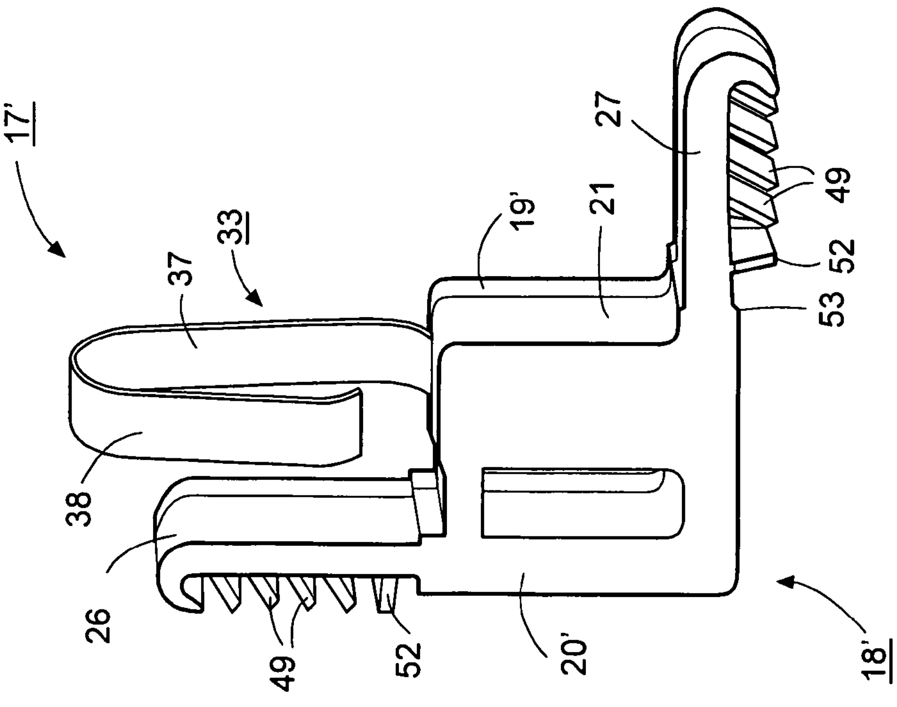
FIG. 10 illustrates a perspective view of the modified corner key assembly of FIG. 9.

Referring to FIG. 9 wherein like reference characters indicate like parts as above, instead of using a tape-like spacer system, use may be made of hollow metal or plastic spacer bars 46 that are secured in place to the respective glass panes 12 by a suitable adhesive, such as a polyisobutylene (PIB). In this embodiment, as shown in FIG. 10, each corner key assembly 17' is formed of a housing 18', for example of plastic, formed of a pair of parts (or two non-symmetrical "halves") 19', 20' that are disposed in mating relation.

Figure 11:
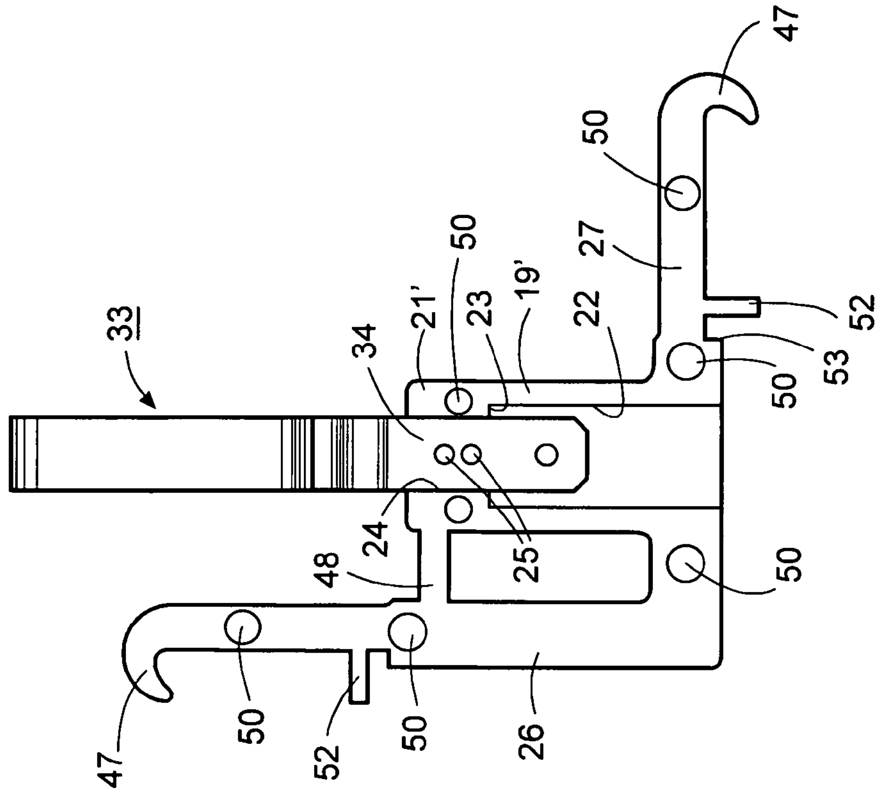
FIG. 11 illustrates a plan view of the common part of the corner key assembly of FIG. 9.

Referring to FIG. 11, the lowermost or bottom part 19' of the housing 18' has a central portion 21 (or hollow post) of rectangular shape formed with a rectangular depression 22 and a shoulder 23 at one end of the depression 22. This shoulder 23 has a recess 24 in which a pair of posts 25, for example of cylindrical shape, is disposed coaxially of the depression 22 for purposes as explained above.

The housing part 19 also has a pair of arms 26, 27 that extend perpendicularly of each other. As shown, one arm 27 extends across the central portion 21 (or hollow post) while the other arm 26 extends in spaced parallel relation to the central portion 21. Each arm 26, 27 has an end that terminates in a rounded hook-like end 47, respectively.

A reinforcing bar 48 extends between the arm 26 and the central portion 21.

Figure 12:
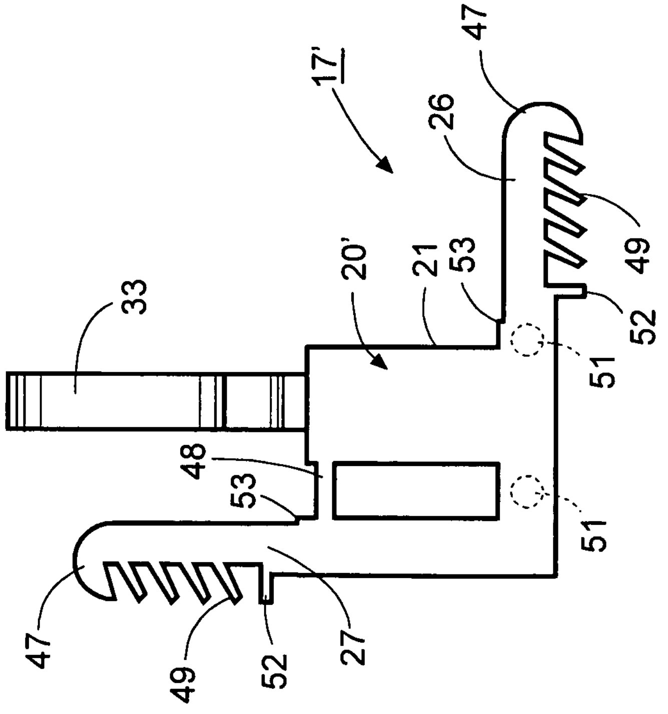
FIG. 12 illustrates a plan view of the second part of the corner key assembly of FIG. 9.

Referring to FIG. 12, the upper part (or half) 20' of the housing 18' is constructed to mate with the bottom part 19' and is of mirror image to the bottom part 19' except that each arm 26, 27 has a plurality of outwardly directed digitated fingers 49 that extend angularly towards the central portion 21 and outwardly of the hook-like end 47. The upper part 20' is also of a thickness that is greater than the thickness of the bottom part 19', and, in particular, a multiple of the thickness of the bottom part 19'. Thus, upper parts 20' of different thicknesses can be provided for a common bottom part 19' to obtain different thicknesses of corner key assemblies 17'.

The housing parts 19', 20' are provided with posts 50 (see FIG. 11) and recesses 51 (see FIG. 12) that serve to snap together with each other to hold the housing parts 19', 20' together as a unit.

A spring clip 33 is mounted in each corner key assembly 17' in similar manner as described above.

Since the arms 26, 27 of the bottom part 19' are free of any fingers 49, these arms have smooth uninterrupted surfaces. Thus, the arms 26, 27 of the upper part 20' are provided with smooth uninterrupted surfaces that extend in parallel relative to the extent of the fingers so that when the housing parts 19', 20' are mated together, the fingers 49 are centrally disposed on the mated together arms 26, 27.

Each arm 26, 27 of a corner key assembly 17 receives an end of a spacer bar 46 in friction fit manner, i.e. each arm 26,27 is slidably disposed in a respective hollow spacer bar 46. To this end, as the digitated fingers 49 of each arm 26, 27 are slid into the open end of a spacer bar 46, being of slightly greater height than the open end of the spacer bar 46, the fingers 49 flex inwardly to frictionally engage and grip the inside of the spacer bar 46.

Each arm 26,27 of the upper part 20' also has a finger 52 that is disposed perpendicularly of the arm at the end of the series of digitated fingers 49 to slide into a spacer bar 46 to close off the end of the spacer bar 46 when in place. In this respect, the finger 52 is of trapezoidal shape with sloped side walls.

Each arm 26,27 of a corner key assembly 17 also has a shoulder 54 for abutting the forward end of a spacer bar 46 and acting as a stop against which the spacer bar abuts when in place.

As indicated in FIG. 9, conventional corner key assemblies 54 are used at the remaining corners of the frame 11 to hold the hollow bars 46 together to form a full-perimeter frame of typically-rectangular shape secure and need not be further described.

In the alternative embodiment employing hollow cross-section metal or PVC spacer systems, the spring clips 33 are modified. That is, the flat surface of the return leg (or the open end) 38 on the spring clips are essentially the same length as the flat leg on the first leg 37 of the spring clip. This is so that they have essentially equal contact length whether they are RH or LH keys.

In this latter embodiment, the hollow spacer bars 46 are filled with a suitable desiccant. Also, the arms 26, 27 of the corner key assemblies 17' can be made to fit any type of hollow spacer bar.

In another embodiment, an insulating glass unit is created that has two panes of conductive glass in opposing orientation that can be energized, in parallel, using these keys. By adding an insulating shrink tube sleeve (not shown) over one or more of the flat surfaces of the spring clip, it is also possible to use these keys with a high-performance, energy-saving Low-Emissivity coating on the opposite surface of glass, such that one surface is electrically heated, and the opposing surface is heat-reflective. Since Low-E coatings are electrically-conductive, it is imperative to insulate the flat surface of the spring clip that is in contact with the Low-E coating if this make-up of glass is employed.

The invention thus provides a corner key assembly that is able to accommodate multiple airspace width insulating glass units as well as multiple types of spacer construction and spacer cross-sections, such as, rectangular, solid cross-section EPDM foam or silicone foam SuperSpacer® spacers, hollow, roll-formed metal spacer bars (e.g., aluminum, galvanized steel, stainless steel, and the like), and hollow extruded PVC spacers or other types of non-metallic spacers.

The corner key assembly also provides for rapid, modular connection of electrical wiring to an IG unit after a traditional manual assembly or an automated assembly of an IG unit. This, in turn, supports the production of IG units using highly automated, conveyorized or robotic IG assembly equipment. In addition, the corner key assembly allows the use of modular connections (e.g. AMP connectors) between wire supply leads and the corner key assembly which provide for rapid and very secure formation of electrical connections.

By using an AMP connector-style of wire lead connection, the invention herein allows for a broken wire lead to be replaced in the field, whereas a traditional style of assembly would not be repairable if the lead were broken close to the perimeter of the insulating glass unit.

In addition, the AMP connector-style of wire lead connection also allows for wire leads of virtually any length to be installed, whereas previous embodiments of spring clip corner keys had the wire leads molded into the corner key, which thus required a pre-determined length of wire to be cut and soldered to the spring clips before expensive insert molding could be completed.

The modular corner key construction and corresponding mold design provides for excellent flexibility across wide-variety of spacer types, cross-sections and airspace widths without having to incur extraordinary tooling costs for each variation to be hard tooled, as in previous designs.

The modular corner key construction and use of separate "halves" to form a corner key housing, allows for high-speed tooling to be employed in the production of the corner keys. Previous embodiments of the spring clip corner keys had the wire leads molded into the corner key, which thus required a pre-determined length of wire to be cut and soldered to the spring clips, wherein this soldered or otherwise joined wire lead and spring clip sub-assembly had to them be manually inserted into a labor-intensive and very expensive insert-mold. This invention eliminates the need for insert molding techniques for routing electrical wiring or contacts through the walls or corners of an insulating glass assembly.

The ramifications of the corner key design result in the following:

(a) manufacturing cost savings associated with the ability to run the new corner key design on highly automated IG manufacturing equipment;

(b) low tooling cost for new airspace widths or spacer materials due to flexibility and modularity of design and use of a common base and spring clip geometry across all part sizes;

(c) elimination of a requirement for separate right-hand (RH) and left-hand (LH) corner key designs by creating a single design that can be "flipped over" to handle opposite handed corners;

(d) elimination of requirement for separate RH and LH corner key designs by creating a single, reversible spring clip design that can be "flipped over" to energize opposing glass surfaces without requiring separate forming of RH and LH spring clips;

(e) ability to energize parallel electrically-conductive panes of glass due to the plural conductive design of the looped spring clip;

(f) elimination of the need for expensive and labor-intensive insert molding tooling for conducting electricity from the outside of an IG unit to the electrically-conductive interior surfaces that need to be energized;

(g) elimination of the need for drilling or punching spacer systems or corner keys to allow wires to pass from the outside of the unit to the interior of the unit; and (h) elimination of the need for separate wire strain relief mechanisms (e.g., wire ties, Heyco fittings, and the like) due to positive detent in the AMP connector to spring clip style of modular electrical connection.

The incorporation of a hollow post 21 to allow use of a modular AMP connector for connecting the spring clip to a wire power lead allows electrical connections to be made post-assembly, and allows IG's to be assembled on automated equipment—traditional designs incorporating wire into key would wrap around belts, pulleys, wheels of conveyorized automated assembly equipment.

The invention thus provides a modular spring clip corner key assembly for use in insulating glass units of different sizes and spacer distances. The modular spring clip corner key assembly allows for a rapid assembly of an insulating glass unit employing an electrically conductive heating film.

Further, the invention provides a corner key assembly that may be used as a left-hand assembly or a right-hand assembly.

Still further, the invention provides an insulating glass unit with a means for creating an electrical contact with bus bars and a conductive glass coating that can be fabricated on highly-automated production lines which cannot accommodate wire leads that are installed onto the insulating glass units while the units is being conveyed or transported or otherwise manipulated by automated equipment during the construction or assembly process.

What is claimed is:

1. A corner key assembly for an electrically heated insulating glass unit, said assembly comprising a housing having a pair of parts disposed in mating relation, said housing having a pair of arms disposed in perpendicular relation to each other and a central post extending in parallel to one of said arms with at least one post thereon and wherein each arm of said pair of arms has a bifurcated end for receiving a spacer strip therein; and a spring clip having a mounting portion disposed between said housing parts and a reversely curved portion extending from said mounting portion and said housing, said spring clip extending from said central post with said mounting portion having at least one opening for selectively receiving said one post therein to retain said clip in said housing.

2. A corner key assembly as set forth in claim 1 wherein each arm of said pair of arms has a plurality of digitated fingers extending therefrom to receive a hollow spacer bar thereon.

3. A corner key assembly as set forth in claim 1 wherein said reversely curved portion of said spring clip includes a first rectilinear section extending from said mounting portion in an offset relation, a second rectilinear section opposite said first rectilinear section and a third curved section between and connected to said rectilinear sections.

4. A corner key assembly as set forth in claim 3 wherein said reversely curved portion of said spring clip further includes a curved section at a terminal end of said second rectilinear section directed toward said first rectilinear section.

5. A corner key assembly as set forth in claim 3 wherein said spring clip is made of beryllium copper.

6. A corner key assembly for an electrically heated insulating glass unit, said assembly comprising an electrically non-conductive housing having a pair of arms disposed in perpendicular relation to each other and a central post extending in parallel to one of said arms; each arm of said pair of arms having a bifurcated end for receiving a spacer strip therein; and an electrically conductive spring clip having a mounting portion mounted in said post and a reversely curved portion extending from said post.

7. A corner key assembly as set forth in claim 6 wherein each arm of said pair of arms has a plurality of digitated fingers extending therefrom to receive a hollow spacer bar thereon.

8. An insulating glass unit comprising a pair of glass panes;

an electrically conductive film on at least one surface of at least one of said pair of panes;

a pair of parallel bus bars mounted on said one pane in electrical contact with opposite sides of said film;

a spacer frame secured to and between said pair of glass panes; said spacer frame being formed of a plurality of strips of foam material that form a rectangular frame;

a pair of corner key assemblies, each said corner key assembly being disposed at a respective corner of said frame and including a housing having a pair of arms disposed in perpendicular relation to each other and a central post extending in parallel to one of said arms and a spring clip extending from said central post and being in contact with a respect one of said pair of bus bars;

each arm of said pair of arms having a bifurcated end for receiving a respective spacer strip therein;

each said spring clip of each of said corner key assemblies having a reversely curved portion extending from said central post of said housing and being disposed in contact with each glass pane of said pair of glass panes; and said reversely curved portion including a first rectilinear section extending from said central portion in an offset relation and being disposed in contact with one of said glass panes, a second rectilinear section opposite said first rectilinear section and being disposed in contact with the other of said glass panes, and a third curved section between and connected to said rectilinear sections.

9. An insulating glass unit as set forth in claim 8 further comprising a sealing bead disposed between said pair of panes and peripherally of said spacer frame.

10. An insulating glass unit as set forth in claim 8 wherein said housing has a passageway for passage of an electrical connector into electrical engagement with said spring clip.

11. An insulating glass unit as set forth in claim 10 further comprising an electrical connector in said housing in electrical engagement with said spring clip and an electrical wire lead extending from said electrical connector and beyond said pair of panes.

12. An insulating glass unit as set forth in claim 8 wherein each said corner key assembly is of identical construction to the other of said pair of corner key assemblies.

13. An insulating glass unit as set forth in claim 8 wherein said reversely curved portion of said spring clip further includes a curved section at a terminal end of said second rectilinear section directed toward said first rectilinear section.

* * * * *